US011836823B2

(12) United States Patent
Yamaguchi

(10) Patent No.: US 11,836,823 B2
(45) Date of Patent: Dec. 5, 2023

(54) TACTILE SENSOR, TACTILE SENSOR SYSTEM, AND PROGRAM

(71) Applicant: FingerVision Co., Ltd., Tokyo (JP)

(72) Inventor: Akihiko Yamaguchi, Sendai (JP)

(73) Assignee: FingerVision Co., Ltd., Tokyo (JP)

(*) Notice: Subject to any disclaimer, the term of this patent is extended or adjusted under 35 U.S.C. 154(b) by 40 days.

(21) Appl. No.: 17/618,854

(22) PCT Filed: Jul. 4, 2019

(86) PCT No.: PCT/JP2019/026650
§ 371 (c)(1),
(2) Date: Dec. 13, 2021

(87) PCT Pub. No.: WO2021/001992
PCT Pub. Date: Jan. 7, 2021

(65) Prior Publication Data
US 2022/0245750 A1 Aug. 4, 2022

(51) Int. Cl.
*G06T 1/00* (2006.01)
*G06V 10/22* (2022.01)
(Continued)

(52) U.S. Cl.
CPC .............. *G06T 1/0014* (2013.01); *B25J 13/08* (2013.01); *G06T 7/001* (2013.01); *G06V 10/141* (2022.01);
(Continued)

(58) Field of Classification Search
CPC .................................. G06V 10/10; G06V 10/20
See application file for complete search history.

(56) References Cited

U.S. PATENT DOCUMENTS 4,599,908 A * 7/1986 Sheridan ................. G01L 1/247
250/227.21
4,668,861 A * 5/1987 White ..................... G06F 3/0421
340/407.1
(Continued)

FOREIGN PATENT DOCUMENTS

EP 0121904 7/1988
EP 2005177977 7/2005
(Continued)

OTHER PUBLICATIONS

Donlon et al., "GelSlim: A High-Resolution, Compact, Robust, and Calibrated Tactile-sensing Finger," arXiv:1803.00628v1, Mar. 1, 2018, pp. 1-9, AAPA furnished via IDS.*
(Continued)

*Primary Examiner* — Guillermo M Rivera-Martinez
(74) *Attorney, Agent, or Firm* — Lee & Hayes, P.C.

(57) ABSTRACT

A tactile sensor includes a transmitting unit including a first surface that is capable of coming into contact with a gripping target object and a second surface that is a back surface of the first surface, an imaging unit that is capable of imaging an image of an object present on a first surface side of the transmitting unit from a second surface side, and a reflecting unit arranged on the second surface side of the transmitting unit and configured to reflect light from at least a part of a region of the transmitting unit and guide the light into an imaging view angle of the imaging unit.

8 Claims, 12 Drawing Sheets

(51) Int. Cl.
  *B25J 13/08* (2006.01)
  *G06T 7/00* (2017.01)
  *G06V 10/141* (2022.01)
  *G06V 20/50* (2022.01)

(52) U.S. Cl.
  CPC .............. *G06V 10/22* (2022.01); *G06V 20/50* (2022.01); *G06T 2207/30108* (2013.01); *G06T 2207/30204* (2013.01)

(56) References Cited

U.S. PATENT DOCUMENTS

| | | | |
|---|---|---|---|
| 6,321,605 B1 | 11/2001 | Gagnon | |
| 2003/0178556 A1* | 9/2003 | Tachi | G01L 1/247 250/208.1 |
| 2007/0040107 A1* | 2/2007 | Mizota | G01L 5/228 250/221 |
| 2008/0027582 A1* | 1/2008 | Obinata | B25J 13/084 73/9 |
| 2009/0315989 A1* | 12/2009 | Adelson | G06F 18/00 348/135 |
| 2020/0139543 A1* | 5/2020 | Saito | B25J 15/10 |

FOREIGN PATENT DOCUMENTS

| | | |
|---|---|---|
| EP | 3290167 | 10/2021 |
| JP | H07128163 A | 5/1995 |
| JP | 2000288973 A * | 10/2000 ............. B25J 13/08 |
| JP | 2000288973 A | 10/2000 |
| JP | 2005257343 A | 9/2005 |
| JP | 2007518966 A | 7/2007 |
| JP | 2009285737 A * | 12/2009 |
| JP | 2009285737 A | 12/2009 |
| JP | 2010221358 A | 10/2010 |
| KR | 101586665 B1 | 1/2016 |
| WO | WO8403855 | 10/1984 |
| WO | WO2018235214 A1 | 6/2017 |

OTHER PUBLICATIONS

Shimonomura et al., Tactile Image Sensors Employing Camera: A Review. Sensors 2019, 19, 3933, pp. 1-21, //doi.org/10.3390/s19183933 (Year: 2019).*

Donlon et al., "GelSlim: A High-Resolution, Compact, Robust, and Calibrated Tactile-sensing Finger," arXiv:1803.00628v1, Mar. 1, 2018, 9 pages.

International Search Report dated Aug. 13, 2019 for PCT application No. PCT/JP2019/026650, 4 pages.

Extended European Search Report dated Mar. 14, 2023 for EP Patent Applciation 19936205.4, 8 pages.

The Japanese Office Action dated Feb. 7, 2023 for Japanese Patent Application 2021-529656 a foreign counterpart to U.S. Appl. No. 17/618,854, 11 pages.

* cited by examiner

TACTILE SENSOR, TACTILE SENSOR SYSTEM, AND PROGRAM

This Application is a national stage application of an international patent application PCT/JP2019/026650 filed Jul. 4, 2019, which is incorporated herein by reference.

TECHNICAL FIELD

The present invention relates to a tactile sensor, a tactile sensor system, and a program.

BACKGROUND ART

In the related art, a method for detecting an object abutting on an outer surface of a rubber skin is known as a method for implementing a tactile sensor (for example, see PTL 1).

CITATION LIST

Patent Literature

PTL 1: JP-A-2000-288973

SUMMARY OF INVENTION

Technical Problem

In the tactile sensor in the related art, an imaging optical axis of an imaging unit is provided parallel to a normal line direction of the rubber skin (hereinafter, referred to as an abutting surface). The imaging unit detects a gripping state of the object by imaging the abutting surface and detecting a displacement of the abutting surface when the object abuts on the abutting surface.

Here, a size of the tactile sensor may be small, for example, when an object to be tactually sensed is small. Considering miniaturization of the tactile sensor, it is a problem to shorten a distance between the imaging unit that images the object and the abutting surface, and to miniaturize the imaging unit.

In the tactile sensor in the related art, when trying to shorten the distance between the imaging unit and the contact surface, it is necessary to use a lens having a wide imaging view angle. When using the lens having a wide imaging view angle, there is a problem such as distortion and securement of a light amount. Further, when trying to miniaturize the imaging unit, there is also a limit because an image sensitivity is lowered accompanying the miniaturization of the imaging unit, and it is not possible to make the tactile sensor smaller than the imaging unit. That is, considering the miniaturization of the tactile sensor, there are problems that it is difficult to maintain an image quality by shortening the distance between the imaging unit and the abutting surface, and that there is a limit to the miniaturization of the imaging unit.

That is, in the related art, there is a problem that the tactile sensor would not be easily miniaturized.

The invention is made in view of such a situation, and an object of the invention is to provide a tactile sensor that can be easily miniaturized, a tactile sensor system, and a program.

Solution to Problem

A tactile sensor according to one aspect of the invention includes a transmitting unit including a first surface that is capable of coming into contact with a gripping target object and a second surface that is a back surface of the first surface, an imaging unit that is capable of imaging an image of an object present on a first surface side of the transmitting unit from a second surface side, and a reflecting unit arranged on the second surface side of the transmitting unit and configured to reflect light from at least a part of a region of the transmitting unit and guide the light into an imaging view angle of the imaging unit.

In the tactile sensor according to one aspect of the invention, at least a part of the transmitting unit deforms along a shape of the gripping target object that is in contact with the first surface, and the imaging unit is capable of imaging an image of the object present on the first surface side and images of markers attached to the transmitting unit from the second surface side, the markers indicating a deformation of the transmitting unit.

In the tactile sensor according to one aspect of the invention, the imaging unit is arranged such that an imaging optical axis of the imaging unit and a normal line of the second surface of the transmitting unit have an intersection.

In the tactile sensor according to one aspect of the invention, the reflecting unit includes a plurality of reflecting surfaces having different normal line angles with respect to an imaging optical axis of the imaging unit.

In the tactile sensor according to one aspect of the invention, the imaging unit images both a first image that is an image of an imaging target region of the transmitting unit formed by light incident without passing through the reflecting unit, and a second image that is an image of the imaging target region of the transmitting unit formed by light reflected by the reflecting unit and then incident on the imaging unit, as images of the transmitting unit.

In the tactile according to one aspect of the invention, the transmitting unit includes a plurality of regions having different normal line angles with respect to an imaging optical axis of the imaging unit, and the imaging unit is capable of imaging an image of the object present on the first surface side formed by light incident through each of the plurality of regions of the transmitting unit.

In addition, a tactile sensor system according to another aspect of the invention includes the above tactile sensor, and a detecting unit configured to acquire the image imaged by the imaging unit and detect a contact state of an object with respect to the first surface based on the acquired image.

In addition, a program according to another aspect of the invention causes a computer connected to a tactile sensor to execute an image acquisition step of acquiring an image imaged by an imaging unit, and a detection step of detecting a contact state of an object with respect to a first surface based on the image acquired in the image acquisition step. The tactile sensor includes a transmitting unit including the first surface that is capable of coming into contact with a gripping target object and a second surface that is a back surface of the first surface, an imaging unit that is capable of imaging an image of an object present on a first surface side of the transmitting unit from a second surface side, and a reflecting unit arranged on the second surface side of the transmitting unit and configured to reflect light from at least a part of a region of the transmitting unit and guide the light into an imaging view angle of the imaging unit.

Advantageous Effect

According to the invention, it is possible to provide a tactile sensor that can be easily miniaturized, a tactile sensor system, and a program.

DESCRIPTION OF EMBODIMENTS

Hereinafter, embodiments of the invention will be described with reference to the drawings.

[Configuration of Robot System 100]

Figure 1:
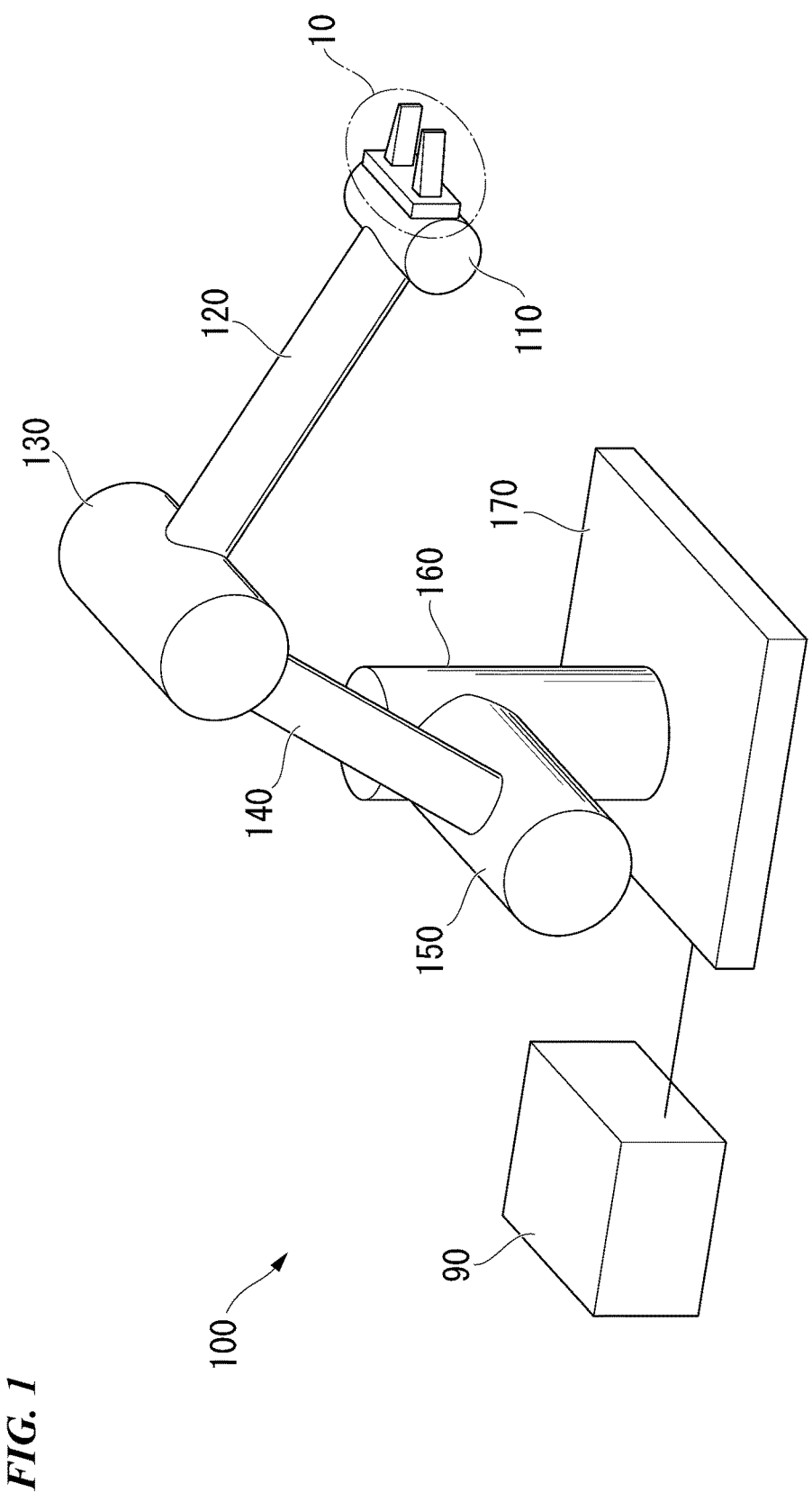
FIG. 1 shows an example of a robot system according to an embodiment.

FIG. 1 shows an example of a robot system 100 according to an embodiment. The robot system 100 in the present embodiment grips a gripping target object while detecting a gripping state by coming into contact with the gripping target object.

In the present embodiment, the robot system 100 includes a tactile sensor module 10, a robot system control unit 90, a tip portion 110, an upper arm portion 120, a joint portion 130, a lower arm portion 140, a main horizontal shaft portion 150, a main vertical shaft portion 160, and a base portion 170.

The base portion 170 is a portion connected to the main vertical shaft portion 160.

The main vertical shaft portion 160 is a portion connecting the main horizontal shaft portion 150 and the base portion 170. The main vertical shaft portion 160 is controlled by the robot system control unit 90, and displaces the main horizontal shaft portion 150 around a shaft of the main vertical shaft portion 160.

The main horizontal shaft portion 150 is a portion connecting the lower arm portion 140 and the main vertical shaft portion 160. The main horizontal shaft portion 150 is controlled by the robot system control unit 90, and displaces the lower arm portion 140 around a shaft of the main horizontal shaft portion 150.

The lower arm portion 140 is a portion connecting the joint portion 130 and the main horizontal shaft portion 150.

The joint portion 130 is a portion connecting the upper arm portion 120 and the lower arm portion 140. The joint portion 130 is controlled by the robot system control unit 90, and displaces the upper arm portion 120 around a shaft of the joint portion 130.

The upper arm portion 120 is a portion connecting the tip portion 110 and the joint portion 130.

The tip portion 110 is connected to the tactile sensor module 10. A posture (for example, position and direction) of the tip portion 110 is controlled by the robot system control unit 90. The posture of the tactile sensor module 10 changes as the posture of the tip portion 110 changes.

The tactile sensor module 10 detects a contact state of the gripping target object, and outputs information indicating the detected contact state of the gripping target object to the robot system control unit 90.

The robot system control unit 90 acquires the information output by the tactile sensor module 10.

The robot system control unit 90 moves the tactile sensor module 10 by displacing the portions included in the robot system 100 (the tip portion 110, the upper arm portion 120, the joint portion 130, the lower arm portion 140, the main horizontal shaft portion 150, and the main vertical shaft portion 160) by a driving device (not shown). The robot system control unit 90 controls the robot system 100 based on the information acquired from the tactile sensor module 10.

Figure 2:
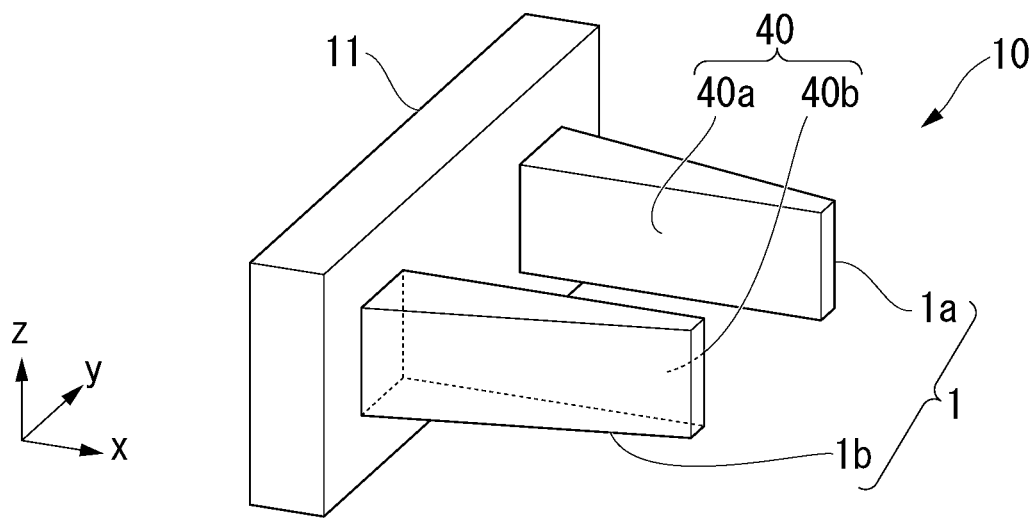
FIG. 2 shows an example of a tactile sensor module according to the embodiment.

FIG. 2 shows an example of the tactile sensor module 10 according to the embodiment. The tactile sensor module 10 according to the present embodiment includes a sensor connecting portion 11, a first tactile sensor 1a, and a second tactile sensor 1b. In the following description, the posture of the tactile sensor module 10 may be shown by a three-dimensional orthogonal coordinate system of an x-axis, a y-axis, and a z-axis.

The sensor connecting portion 11 is a portion connecting the tip portion 110 and the first tactile sensor 1a and the second tactile sensor 1b.

The first tactile sensor 1a is connected to the sensor connecting portion 11. The first tactile sensor 1a includes a first transmitting unit contact surface 40a.

The second tactile sensor 1b is connected to the sensor connecting portion 11. The second tactile sensor 1b includes a second transmitting unit contact surface 40b.

The first tactile sensor 1a and the second tactile sensor 1b are arranged such that the first transmitting unit contact surface 40a and the second transmitting unit contact surface 40b face each other. The sensor connecting portion 11 includes a driving device (not shown), and displaces the first tactile sensor 1a and the second tactile sensor 1b (or one of those sensors; the same applies to the following description.) in a y-axis direction based on an instruction from the robot system control unit 90. The tactile sensor module 10 grips a gripping target object between the first tactile sensor 1a and the second tactile sensor 1b by driving the first tactile sensor 1a and the second tactile sensor 1b in the y-axis direction.

[Configuration of Tactile Sensor 1]

Figure 3:
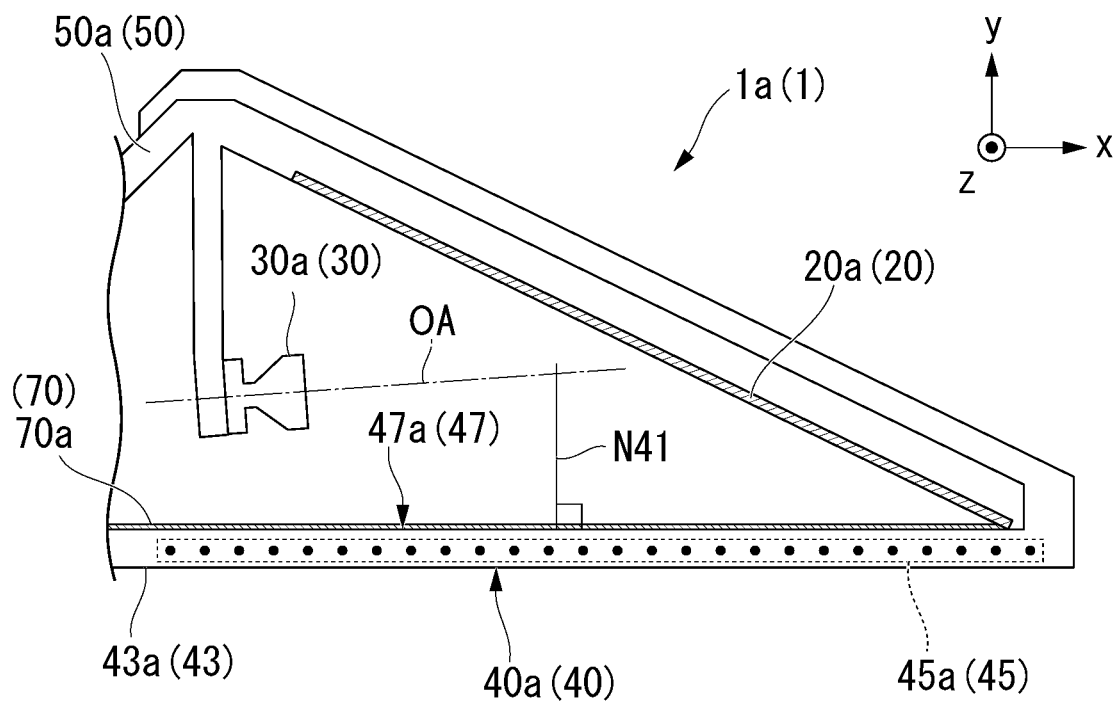
FIG. 3 shows an example of a cross-sectional view of a tactile sensor according to the embodiment.

FIG. 3 shows an example of a cross-sectional view of a tactile sensor according to the embodiment. FIG. 3 shows a cross-sectional view of the first tactile sensor 1a shown in FIG. 2 on an x-y plane. The direction of the tactile sensor module 10 is indicated by the three-dimensional orthogonal coordinate system of the x-axis, the y-axis, and the z-axis.

Since the first tactile sensor 1a and the second tactile sensor 1b have the same configuration, the first tactile sensor 1a will be described, and the description of the second tactile sensor 1b will be omitted.

The first tactile sensor 1a includes a first imaging unit 30a, a first reflecting unit 20a, a transmitting unit 43a, first markers 45a, the first transmitting unit contact surface 40a, a first transmitting unit non-contact surface 47a, a first rigid layer 70a, and a first frame 50a.

In addition, in the following description, the first imaging unit 30a will be referred to as an imaging unit 30, the first reflecting unit 20a will be referred to as a reflecting unit 20, the first transmitting unit 43a will be referred to as a transmitting unit 43, the first markers 45a will be referred to as markers 45, the first transmitting unit contact surface 40a will be referred to as a transmitting unit contact surface 40, the first transmitting unit non-contact surface 47a will be referred to as a transmitting unit non-contact surface 47, the first rigid layer 70a will be referred to as a rigid layer 70, and the first frame 50a will be referred to as a frame 50, respectively.

The frame 50 holds the imaging unit 30, the reflecting unit 20, the transmitting unit 43, and the rigid layer 70.

The transmitting unit 43 is made of a transparent material that transmits light, and includes the transmitting unit contact surface 40 and the transmitting unit non-contact surface 47. For example, a specific material of the transmitting unit 43 may be a silicone material having a thickness of 2 mm and a transmittance of about 94%.

The transmitting unit contact surface 40 is a surface capable of coming into contact with the gripping target object of a front surface and a back surface of the transmitting unit 43. The transmitting unit non-contact surface 47 is a surface that does not come into contact with the gripping target object of the front surface and the back surface of the transmitting unit 43.

In the following description, of the surfaces of the transmitting unit 43, the surface that is capable of coming into contact with the gripping target object (that is, the transmitting unit contact surface 40) is also referred to as the front surface or a first surface, and the surface that does not come into contact with the gripping target object (that is, the transmitting unit non-contact surface 47) is also referred to as the back surface or a second surface. In addition, the transmitting unit 43 includes the transmitting unit contact surface 40, which is a contact surface that is capable of coming into contact with the gripping target object, and the transmitting unit non-contact surface 47, which is the back surface of the contact surface and is a non-contact surface that does not come into contact with the gripping target object.

In addition, the transmitting unit 43 is made of a transparent material. In this example, at least a part of the transmitting unit 43 deforms along a shape of the gripping target object that is in contact with the transmitting unit contact surface 40, which is the contact surface.

A plurality of markers 45 are arranged at predetermined positions of the transmitting unit 43. In an example of the present embodiment, the markers 45 are opaque members arranged at positions of grid points separated at equal intervals inside the transmitting unit 43. The markers 45 are arranged inside the transmitting unit 43, but are not limited thereto, and may be provided on the transmitting unit contact surface 40 or on the transmitting unit non-contact surface 47. In addition, the markers 45 are described as being arranged discretely at the positions of the grid points, but are not limited thereto. The markers 45 may be a grid pattern or another continuous pattern. The pattern of the markers 45 may be an irregular pattern so that a gripping state of the gripping target object can be easily detected. The markers 45 are described as opaque members, but are not limited thereto, and the markers may be semi-transparent members or transparent members as long as the displacement when the gripping target object is in contact can be optically recognized.

The rigid layer 70 is provided at a position in contact with the transmitting unit non-contact surface 47 of the transmitting unit 43. The rigid layer 70 is made of a transparent and rigid material such as acrylic. The rigid layer 70 limits a deformation amount of the transmitting unit 43 when the gripping target object is gripped.

In the present embodiment, the transmitting unit 43 and the rigid layer 70 are described as separate components. The rigid layer 70 may be omitted as long as the deformation amount of the transmitting unit 43 when the gripping target object is gripped is within a predetermined range.

The reflecting unit 20 includes a reflecting surface that reflects light, such as a mirror. This reflecting surface is arranged on a non-contact surface side of the transmitting unit 43. The reflecting unit 20 reflects light transmitted through the transmitting unit 43 and guides the reflected light to the imaging unit 30.

The reflecting unit 20 reflects light from at least a part of a region of the transmitting unit 43. That is, the reflecting unit 20 is arranged on the non-contact surface side of the transmitting unit 43 (for example, the transmitting unit non-contact surface 47), and reflects the light from at least a part of the region of the transmitting unit 43 and guides the light into an imaging view angle of the imaging unit 30.

The imaging unit 30 is arranged on a transmitting unit non-contact surface 47 side of the front surface and the back surface of the transmitting unit 43. More specifically, the imaging unit 30 is arranged such that an imaging optical axis OA of the imaging unit 30 and a normal line N41 of the transmitting unit non-contact surface 47 of the transmitting unit 43 have an intersection (the imaging optical axis OA and the normal line N41 are not parallel to each other).

The imaging unit 30 images an image within the imaging view angle around the imaging optical axis OA, and outputs an imaging result as image information. The imaging unit 30 is capable of imaging the image of an object present on a transmitting unit contact surface 40 side of the transmitting unit 43 from the transmitting unit non-contact surface 47 side.

Here, light transmitted through the transmitting unit includes the image of the object present on the transmitting unit contact surface 40 side of the transmitting unit 43. The light transmitted through the transmitting unit 43 further includes images of the markers 45 arranged on the transmitting unit 43 (that is, an image of the transmitting unit 43 or an image of the transmitting unit). That is, the imaging unit 30 is capable of imaging the image of the object present on the transmitting unit contact surface 40 side, which is a contact surface side of the transmitting unit 43, and the images of the markers that are attached to the transmitting unit 43 and indicate a deformation of the transmitting unit 43, from the transmitting unit non-contact surface 47 side, which is the non-contact surface side.

In addition, an imageable range of the imaging unit 30 includes an image formed by light transmitted through the transmitting unit 43 and reflected by the reflecting unit 20 and an image formed by light that is transmitted through the transmitting unit 43 and directly reaches the imaging unit 30 without passing through the reflecting unit 20. In the following description, the image formed by the light that is transmitted through the transmitting unit 43 and directly reaches the imaging unit 30 without passing through the reflecting unit 20 is also referred to as a direct image. In addition, the image formed by the light transmitted through the transmitting unit 43 and reflected by the reflecting unit 20 is also referred to as a reflected image. The imageable range of the imaging unit 30 will be described with reference to FIGS. 4 and 5.

[Imageable Range of Imaging Unit 30]

Figure 4:
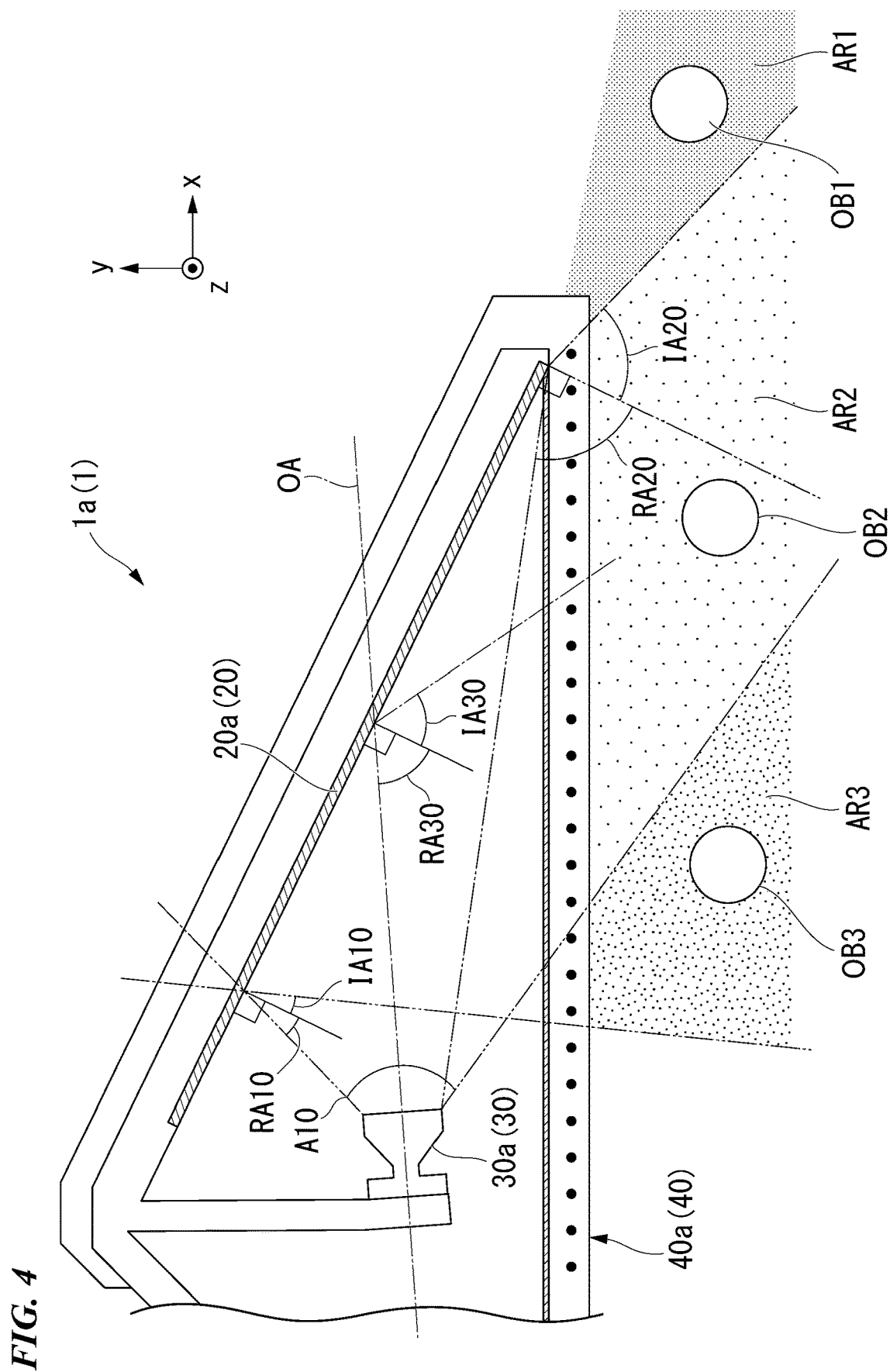
FIG. 4 shows an example of an imageable range of an imaging unit according to the embodiment.

FIG. 4 shows an example of the imageable range of the imaging unit 30 according to the embodiment. The imageable range of the imaging unit 30 included in the tactile sensor 1 will be described.

In this example, the imageable range of the imaging unit 30 is determined by a geometric relative relation between a view angle A10 of the imaging unit 30 and an arrangement of the reflecting unit 20. The imageable range of the imaging unit 30 includes a region where the direct image can be imaged and a region where the reflected image can be imaged.

For example, when an incident angle of light incident on the reflecting unit 20 from the transmitting unit contact surface 40 side is a first incident angle IA10, the light incident on the reflecting unit 20 is emitted in the direction of a first reflecting angle RA10.

When the incident angle of the light incident on the reflecting unit 20 from the transmitting unit contact surface 40 side is a second incident angle IA20, the light incident on the reflecting unit 20 is emitted in the direction of a second reflecting angle RA20.

In addition, when the incident angle of the light incident on the reflecting unit 20 from the transmitting unit contact surface 40 side is a third incident angle IA30, the light incident on the reflecting unit 20 is emitted in the direction of a third reflecting angle RA30 (in this example, the imaging optical axis OA).

When the image formed by the light emitted from the reflecting unit 20 (that is, the reflected image) is included in the view angle A10, the imaging unit 30 can image the light emitted from the reflecting unit 20.

A first imaging range AR1 is a range in which the imaging unit 30 can image the direct image and cannot image the reflected image.

A second imaging range AR2 is a range in which the imaging unit 30 can image both the direct image and the reflected image.

A third imaging range AR3 is a range in which the imaging unit 30 cannot image the direct image and can image the reflected image.

Figure 5:
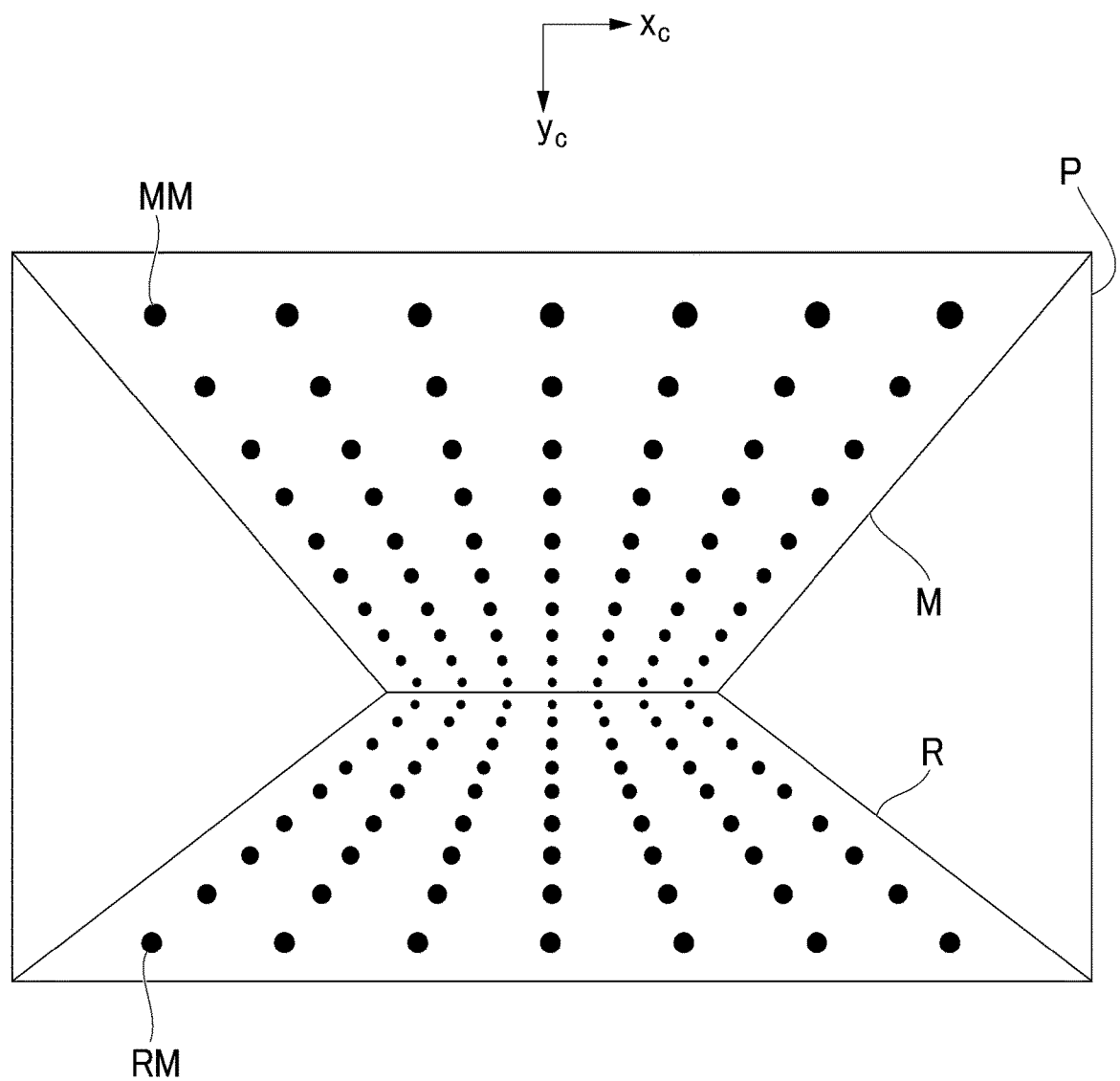
FIG. 5 shows an example of an imaged image of the imaging unit according to the embodiment.

FIG. 5 shows an example of an imaged image of the imaging unit 30 according to the embodiment. An imaged image P includes a direct view imaged image R and a reflected view imaged image M as image components. The imaged image P is shown by a two-dimensional orthogonal coordinate system of an $x_c$-axis and a $y_c$-axis. An $x_c y_c$ plane shows an image plane on which a yz plane is imaged in FIG. 4.

Direct view imaging markers RM are images obtained by imaging direct images of the markers 45 by the imaging unit 30.

Reflected view imaging markers MM are images obtained by imaging reflected images of the markers 45 by the imaging unit 30.

Hereinafter, a first object OB1 to a third object OB3 will be described as an example with reference to FIGS. 4 and 5.

In this example, the first object OB1 is present in the first imaging range AR1. In this case, the imaging unit 30 can image a direct image of the first object OB1 and cannot image a reflected image of the first object OB1.

The second object OB2 is present in the second imaging range AR2. In this case, the imaging unit 30 can image a direct image and a reflected image of the second object OB2.

The third object OB3 is present in the third imaging range AR3. In this case, the imaging unit 30 cannot image a direct image of the third object OB3 and can image a reflected image of the third object OB3.

The imaging unit 30 images both a first image, which is the image of an imaging target region of the transmitting unit 43 formed by the light incident without passing through the reflecting unit 20, and a second image, which is the image of the imaging target region of the transmitting unit 43 formed by the light reflected by the reflecting unit 20 and then incident on the imaging unit 30, as images of the transmitting unit 43.

That is, the imaging unit 30 is capable of simultaneously imaging the direct view imaged image R and the reflected view imaged image M.

[When Gripping Target Object is in Contact with Transmitting Unit Contact Surface 40]

Figure 6:
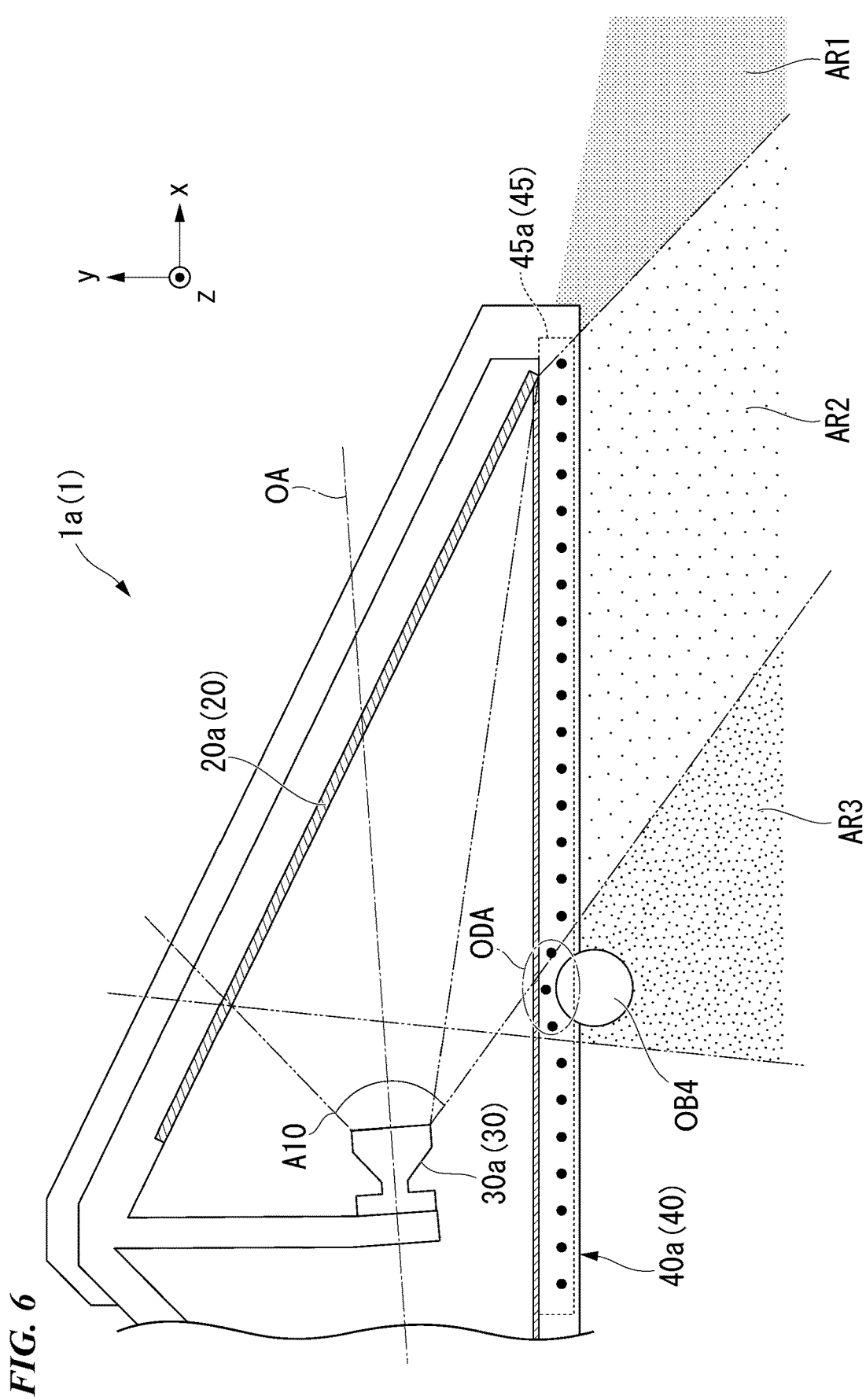
FIG. 6 shows an example of a cross-sectional view of the tactile sensor when a gripping target object according to the embodiment is in contact with a contact surface.

FIG. 6 shows an example of a cross-sectional view of the tactile sensor when the gripping target object according to the embodiment is in contact with the contact surface. As an example, a case where an object OB4 is in contact with the transmitting unit contact surface 40 will be described.

In this example, the object OB4, which is the gripping target object, is in contact with the transmitting unit contact surface 40. A range in which the object OB4 is in contact with the transmitting unit contact surface 40 is defined as an object detection range ODA. Before and after the object comes into contact with the transmitting unit contact surface 40, the markers 45 in the object detection range ODA are displaced. The imaging unit 30 images the markers 45 in the object detection range ODA in time series.

In this example, the object OB4 is present at a position that spans imaging ranges of both the second imaging range AR2 and the third imaging range AR3. Therefore, both a direct view and a reflected view are possible.

Figure 7:
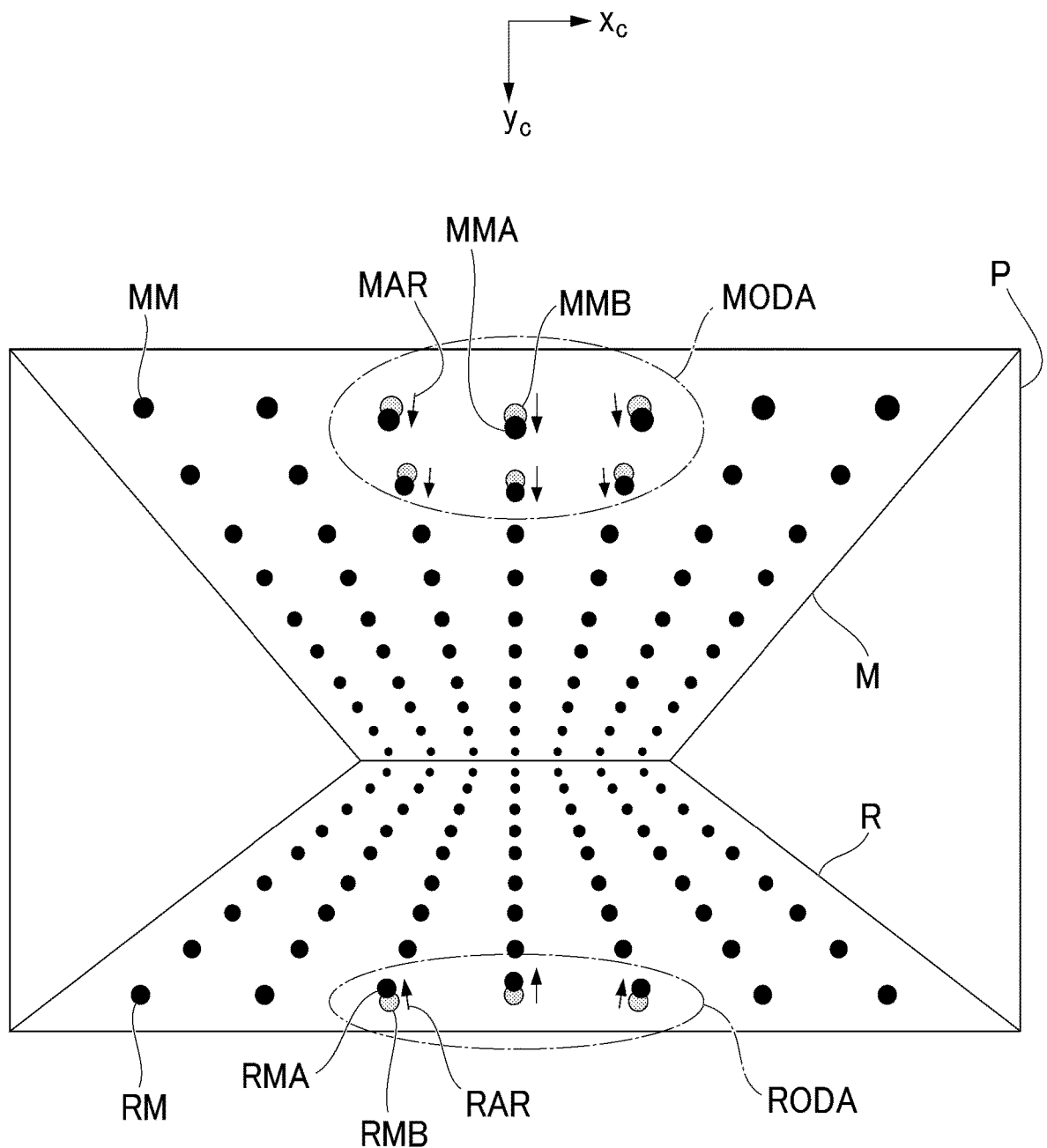
FIG. 7 shows an example of an imaged image of the tactile sensor when the gripping target object according to the embodiment is in contact with the contact surface.

FIG. 7 shows an example of the imaged image of the tactile sensor when the gripping target object according to the embodiment is in contact with the contact surface. The imaged image P includes the direct view imaged image R and the reflected view imaged image M as image components. FIG. 7 shows the imaged image P when the object OB4 is in contact with the transmitting unit contact surface 40.

The direct view imaging markers RM are imaged in the direct view imaged image R. Here, a direct view object detection range RODA is the range that is imaged as the direct view imaged image R of the object detection range ODA.

The reflected view imaging markers MM are imaged in the reflected view imaged image M. Here, a reflected view object detection range MODA is the range that is imaged as the reflected view imaged image M of the object detection range ODA.

Here, the direct images of the markers 45 will be described by comparing positions of the markers 45 before contact of the object OB4 with positions of the markers 45 after the contact of the object OB4.

Pre-contact direct view marker images RMB show the direct view imaging markers RM before the object OB4 comes into contact with the transmitting unit contact surface 40 in the direct view object detection range RODA.

Post-contact direct view marker images RMA show the direct view imaging markers RM after the object OB4 comes into contact with the transmitting unit contact surface 40 in the direct view object detection range RODA.

Here, differences in the positions of the markers 45 in the images due to a time change are represented by marker vectors. The differences in the positions in the images are generated between the pre-contact direct view marker images RMB and the post-contact direct view marker images RMA, as shown in FIG. 7. Direct view marker vectors RAR indicate the differences between the pre-contact direct view marker images RMB and the post-contact direct view marker images RMA. The robot system 100 can detect the gripping state of the object OB4 by obtaining the direct view marker vectors RAR.

As for the reflected images of the markers 45, the differences in the positions of the markers 45 in the images due to the time change may be represented by marker vectors in the same manner as the direct images. That is, the differences in the positions in the images are generated between pre-contact reflected view marker images MMB and post-contact reflected view marker images MMA, as shown in FIG. 7. Reflected view marker vectors MAR indicate the differences between the pre-contact reflected view marker images MMB and the post-contact reflected view marker images MMA. The robot system 100 can detect the gripping state of the object OB4 by obtaining the reflected view marker vectors MAR.

[When Gripping Target Object is in Contact with Transmitting Unit Contact Surface 40]

Figure 8:
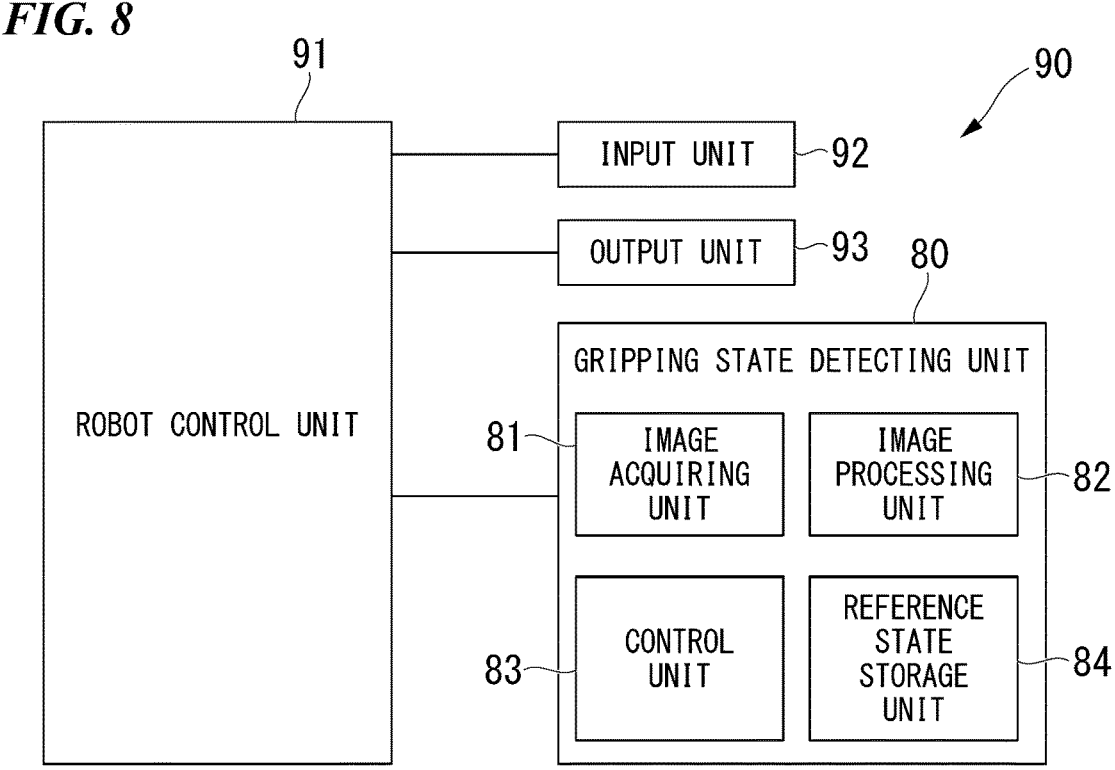
FIG. 8 shows an example of a robot system control unit according to the embodiment.

FIG. 8 shows an example of the robot system control unit 90 according to the embodiment.

The robot system control unit 90 includes a robot control unit 91, an input unit 92, an output unit 93, and a gripping state detecting unit 80.

The robot control unit 91 includes a communicating unit that communicates with a microcomputer, memories such as random access memory (RAM) and read only memory (ROM), and an external device (none shown).

The input unit 92 acquires information from sensors such as a pressure sensor, a position sensor, a temperature sensor, and an acceleration sensor, a camera, and a microphone (none shown).

The output unit 93 outputs a drive signal to a robot drive motor (not shown) or the like.

The gripping state detecting unit 80 includes an image acquiring unit 81, an image processing unit 82, a control unit 83, and a reference state storage unit 84.

In the robot system 100, the gripping state detecting unit 80, which is a detecting unit, acquires the image imaged by the imaging unit 30 and detects the contact state of the object with respect to the transmitting unit contact surface 40 based on the acquired image.

The gripping state detecting unit 80 provides the detected gripping state to the robot control unit 91.

The image acquiring unit 81 acquires the image information imaged by the imaging unit 30. The image acquiring unit 81 provides the image acquired by the imaging unit 30 to the image processing unit 82.

In this example, the image acquired by the imaging unit 30 is described as a still image, and the information acquired by the imaging unit 30 may be a moving image.

The image processing unit 82 acquires the image from the image acquiring unit 81. The image processing unit 82 detects the positions of the markers 45 based on the acquired image.

The reference state storage unit 84 stores position information on the markers 45 in a state where no object is detected, that is, reference position information. That is, the reference state storage unit 84 stores reference position information on the direct view imaging markers RM obtained by imaging the markers 45 on the direct view imaging image R, and reference position information on the reflected view imaging markers MM obtained by imaging the markers 45 on the reflected view imaged image M.

The control unit 83 acquires, from the image processing unit 82, the reference position information on the direct view imaging markers RM, the reference position information on the reflected view imaging markers MM, and a detection result of the positions of the markers 45. The detection result of the positions of the markers 45 includes the position information on the direct view imaging markers RM and the position information on the reflected view imaging markers MM.

In addition, the control unit 83 acquires, from the reference state storage unit 84, the reference position information on the direct view imaging markers RM and the reference position information on the reflected view imaging markers MM. The control unit 83 obtains the displacement of the direct view imaging markers RM (for example, the direct view marker vectors RAR) based on the position information on the direct view imaging markers RM indicated in the imaged image P and the reference position information on the direct view imaging markers RM acquired from the reference state storage unit 84. The control unit 83 obtains the displacement of the reflected view imaging markers MM (for example, the reflected view marker vectors MAR) based on the position information on the reflected view imaging markers MM indicated in the imaged image P and the reference position information on the reflected view imaging markers MM acquired from the reference state storage unit 84.

The control unit 83 outputs displacement information on the markers 45 to the robot control unit 91. The displacement information on the markers 45 indicates the gripping state of the gripping target object. That is, the control unit 83 detects the gripping state of the gripping target object.

In addition, when a displacement amount of the markers 45 exceeds a predetermined value, the control unit 83 may determine that the object is in contact with the transmitting unit contact surface 40.

In the control unit 83, the image acquiring unit 81 may output the image imaged by the imaging unit 30 to the robot control unit 91. The image imaged by the imaging unit 30 includes the image of the object present on the transmitting unit contact surface 40 side of the transmitting unit 43. That is, the image imaged by the imaging unit 30 includes an image of a state of an outside world that can be observed through the transmitting unit 43. According to the gripping state detecting unit 80 configured in this way, the robot control unit 91 can grasp a surrounding state of the transmitting unit contact surface 40 regardless of whether the object is in contact with the transmitting unit contact surface 40.

Figure 9:
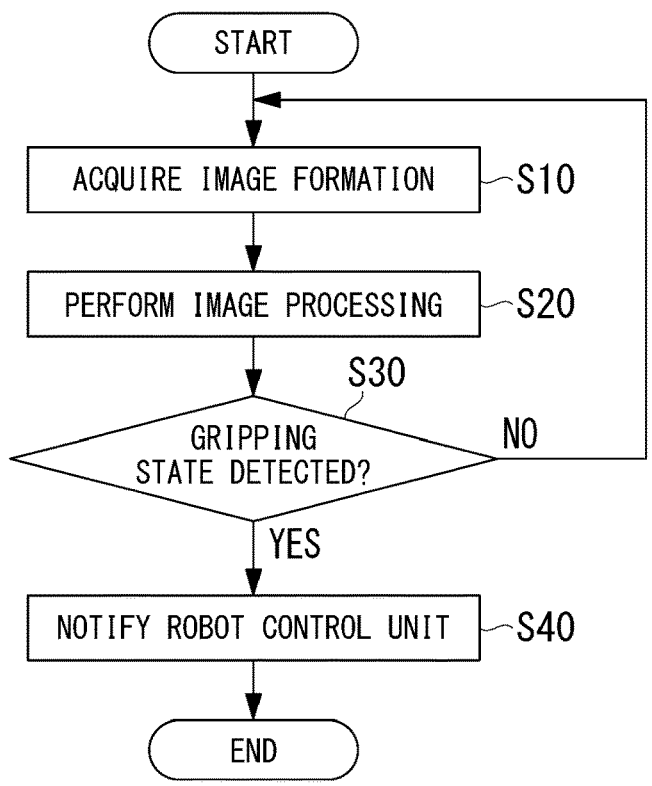
FIG. 9 shows an example of operations of the robot system control unit according to the embodiment.

FIG. 9 shows an example of operations of the robot system control unit 90 according to the embodiment. The example of the operations of the robot system control unit 90 will be described with reference to FIG. 9.

(Step S10) The image acquiring unit 81 acquires the image information imaged by the imaging unit 30. The image acquiring unit 81 provides the image acquired by the imaging unit 30 to the image processing unit 82.

(Step S20) The image processing unit 82 acquires the image from the image acquiring unit 81. The image processing unit 82 processes the acquired image. The image processing unit 82 identifies the range of the direct view imaged image R and the range of the reflected view imaged image M of the imaged image P. The image processing unit 82 provides the position information on the direct view imaging markers RM present in the range of the direct view imaged image R, the position information on the reflected view imaging markers MM present in the range of the reflected view imaged image M, and the imaged image P to the control unit 83. The control unit 83 acquires the position information on the direct view imaging markers RM, the position information on the reflected view imaging markers MM, and the imaged image P from the image processing unit 82. In addition, the control unit 83 acquires the position information on the direct view imaging markers RM and the position information on the reflected view imaging markers MM, which are in the state where no object is detected, from the reference state storage unit 84. The control unit 83 compares the position information on the direct view imaging markers RM and the position information on the reflected view imaging markers MM acquired from the image processing unit 82 with the position information on the direct view imaging markers RM and the position information on the reflected view imaging markers MM acquired from the reference state storage unit 84.

(Step S30) When there is a difference in a comparison result (step S30; YES), the control unit 83 determines that the object is in contact with the transmitting unit contact surface 40, and the process proceeds to step S40. When there is no difference in the comparison result (step S30; NO), the control unit 83 determines that no object is in contact with the transmitting unit contact surface 40, and the process proceeds to step S10.

(Step S40) The control unit 83 notifies the robot control unit 91 of the gripping state. Specifically, the control unit 83 notifies the robot control unit 91 of the displacement information on the direct view imaging markers RM and the reflected view imaging markers MM. In addition, the control unit 83 simultaneously provides the imaged image P when the displacement is detected to the robot control unit 91.

Second Embodiment

Figure 10:
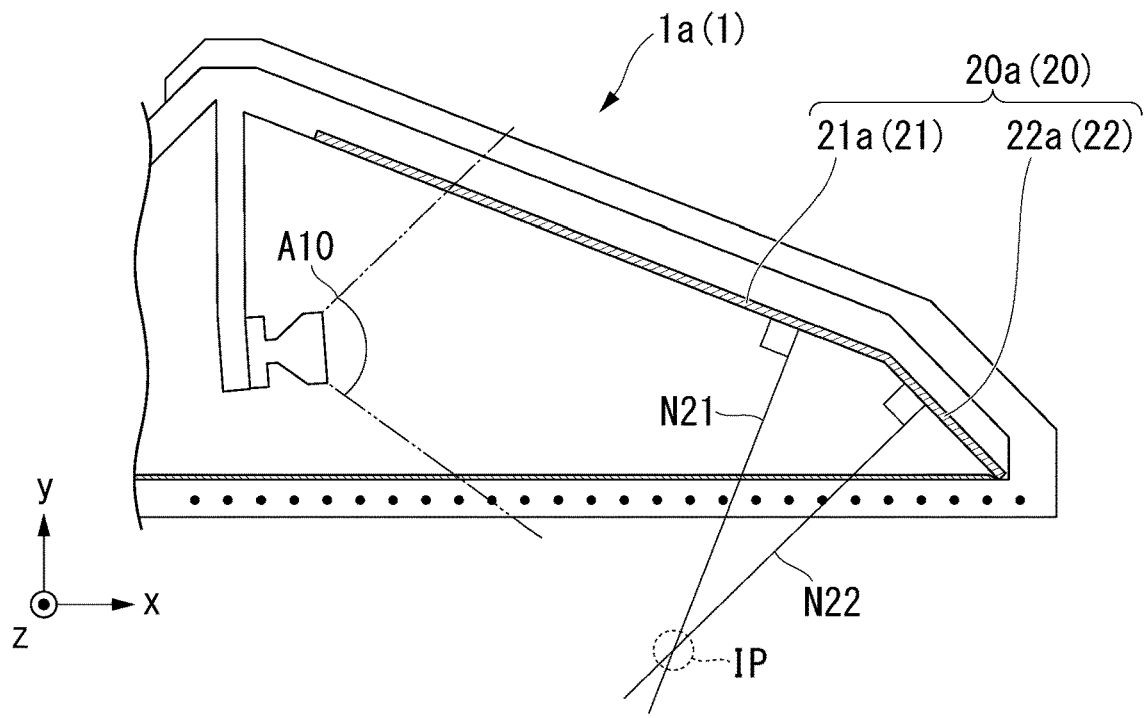
FIG. 10 shows an example of a cross-sectional view of a tactile sensor according to a second embodiment.

FIG. 10 shows an example of a cross-sectional view of a tactile sensor according to a second embodiment.

In the above embodiment, the reflecting unit 20 is described as a single plane. The second embodiment is different from the above embodiment in that the reflecting unit 20 has a plurality of different angles.

In the second embodiment, the tactile sensor 1 includes the reflecting unit 20 having the plurality of different angles. In this example, the tactile sensor 1 includes a first angle reflecting unit 21 and a second angle reflecting unit 22. (Hereinafter, in this embodiment, the reflecting unit 20 is used when the first angle reflecting unit 21 and the second angle reflecting unit 22 are not distinguished from each other.)

A normal line N21 is the normal line of the first angle reflecting unit 21.

A normal line N22 is the normal line of the second angle reflecting unit 22.

Here, the normal line N21 and the normal line N22 intersect at an intersection IP. That is, the tactile sensor 1 includes a plurality of reflecting surfaces having different normal line angles with respect to the imaging optical axis OA of the imaging unit 30.

In the second embodiment, since the tactile sensor 1 includes the plurality of reflecting units 20 having different angles, the imaging unit 30 can observe a wider range even when the view angle A10 is the same as that of the first embodiment.

In addition, in this example, the reflecting unit 20 includes a plurality of reflecting units having different angles (the first angle reflecting unit 21 and the second angle reflecting unit 22). These reflecting units may be formed of different reflecting members. In addition, the reflecting unit having the same effect may be formed by forming the reflecting unit having the plurality of different angles in one reflecting member.

Figure 11:
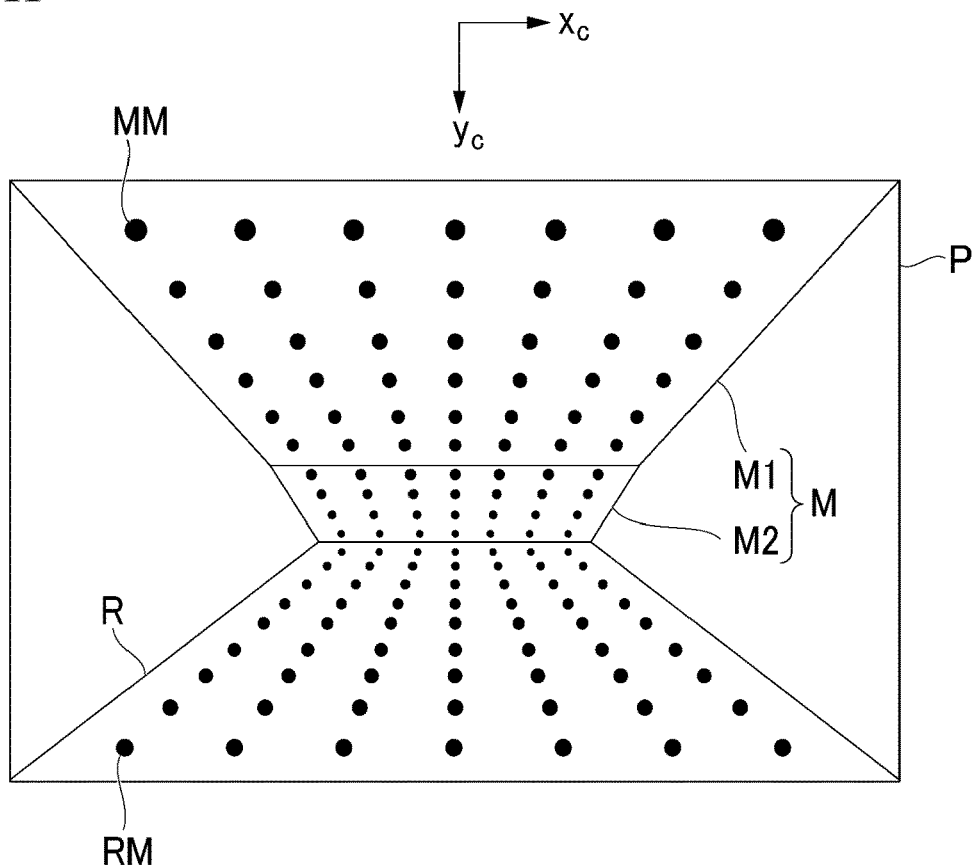
FIG. 11 shows an example of an imageable range of an imaging unit according to the second embodiment.

FIG. 11 shows an example of an imageable range of the imaging unit 30 according to the second embodiment. In the second embodiment, the imaged image P includes the direct view imaged image R, a reflected view imaged image M1 corresponding to the first angle reflecting unit 21, and a reflected view imaged image M2 corresponding to the second angle reflecting unit 22, as image components. (Hereinafter, in this embodiment, the reflected view imaged image M is used when the reflected view imaged image M1 corresponding to the first angle reflecting unit 21 and the reflected view imaged image M2 corresponding to the second angle reflecting unit 22 are not distinguished from each other.)

The direct view imaging markers RM are imaged in the direct view imaged image R as in the first embodiment. In addition, the reflected view imaging markers MM are imaged in the reflected view imaged image M.

The imaging unit 30 detects a gripping state by observing the direct view imaging markers RM and the reflected view imaging markers MM.

Third Embodiment

Figure 12:
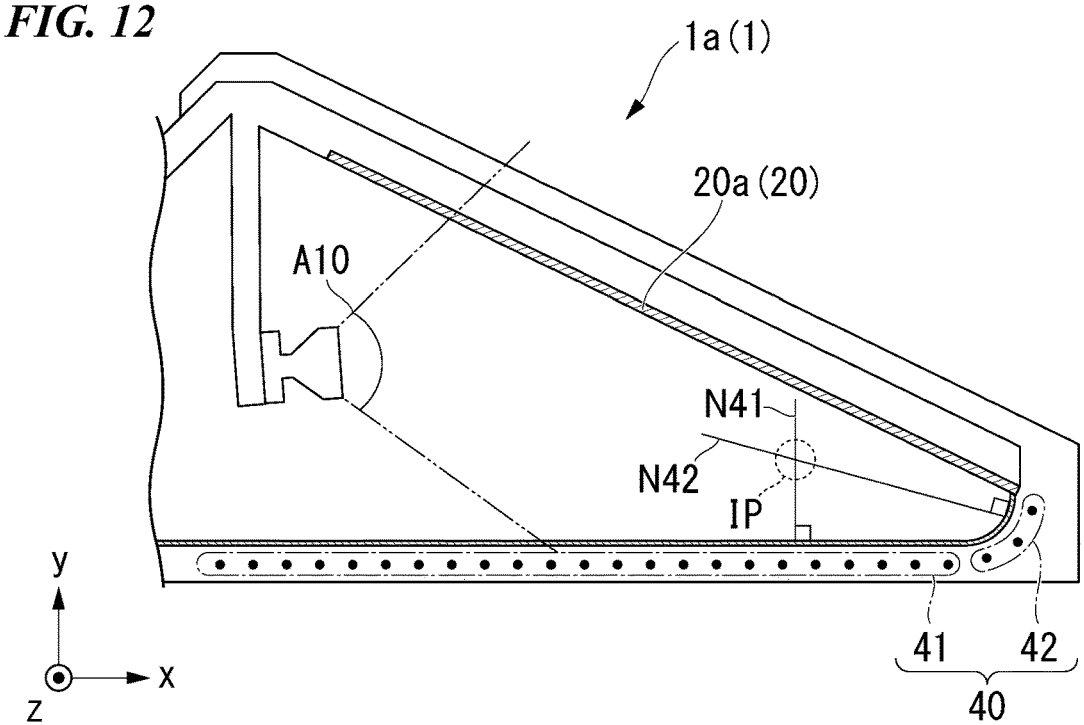
FIG. 12 shows an example of a cross-sectional view of a tactile sensor according to a third embodiment.

FIG. 12 shows an example of a cross-sectional view of a tactile sensor according to a third embodiment.

In the above embodiments, the transmitting unit contact surface 40 is described as a plane. The third embodiment is different from the above embodiments in that the transmitting unit contact surface 40 has a plurality of different angles (that is, has a curved surface).

In the third embodiment, the tactile sensor 1 includes the transmitting unit contact surface 40 having the plurality of different angles. In this example, the tactile sensor 1 includes a first angle transmitting unit contact surface 41 and a second angle transmitting unit contact surface 42. (Hereinafter, in this embodiment, the transmitting unit contact surface 40 is used when the first angle transmitting unit contact surface 41 and the second angle transmitting unit contact surface 42 are not distinguished from each other.)

A normal line N41 is the normal line of the first angle transmitting unit contact surface 41.

A normal line N42 is the normal line of the second angle transmitting unit contact surface 42.

Here, the normal line N41 and the normal line N42 intersect at the intersection IP. That is, the transmitting unit 43 includes a plurality of regions having different normal line angles with respect to the imaging optical axis OA of the imaging unit 30. The imaging unit 30 can image an image of an object present on a transmitting unit contact surface 40 side formed by light incident through each of the plurality of regions of the transmitting unit 43.

In the third embodiment, since the tactile sensor 1 includes the plurality of transmitting unit contact surfaces 40 having different angles, the imaging unit 30 can observe a wider range even when the view angle A10 is the same as that of the first embodiment. In particular, in the third embodiment, the provision of the second angle transmitting unit contact surface 42 enables an observation in a wider range in an x-axis direction. Therefore, when the robot system control unit 90 moves the position of the tactile sensor module 10 in the x-axis direction, a collision with an object in a traveling direction can be detected in advance by the image imaged by the imaging unit 30 included in the tactile sensor 1.

That is, in the third embodiment, since the tactile sensor 1 includes the second angle transmitting unit contact surface 42, the tactile sensor 1 detects the object present in the traveling direction. Therefore, the tactile sensor 1 can avoid the collision with the object present in the traveling direction.

Figure 13:
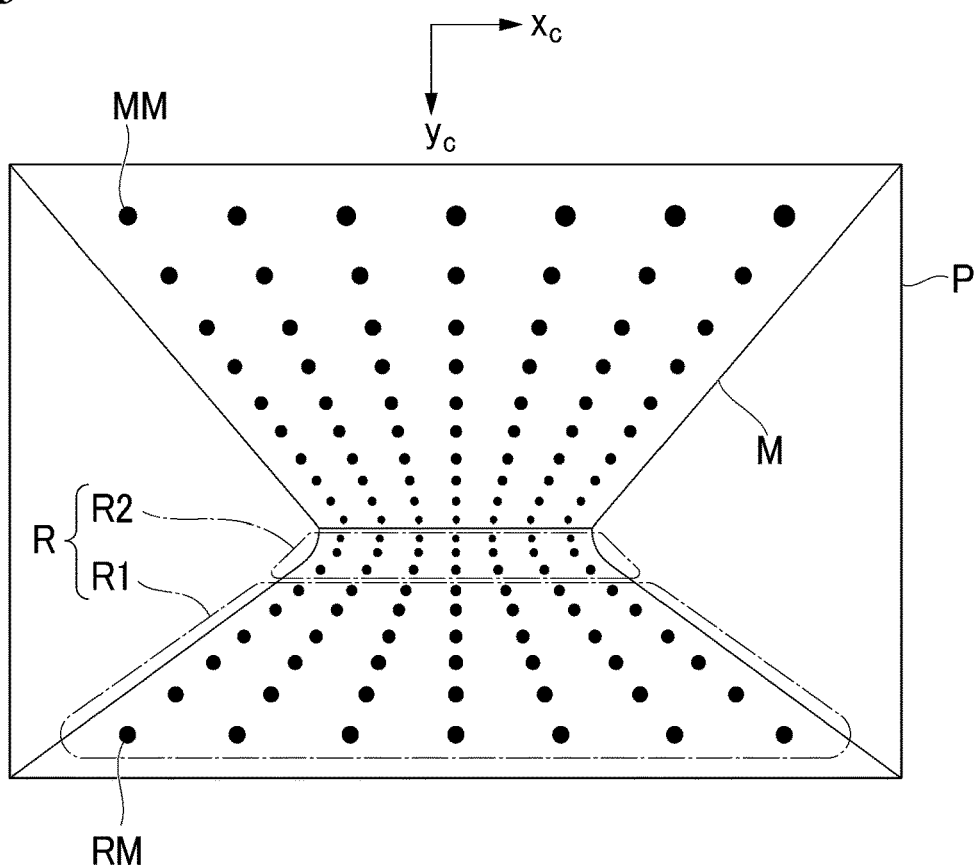
FIG. 13 shows an example of an imageable range of an imaging unit according to the third embodiment.

FIG. 13 shows an example of an imageable range of the imaging unit 30 according to the third embodiment. In the third embodiment, the imaged image P includes a direct view imaged image R1 corresponding to the first angle transmitting unit contact surface 41, a direct view imaged image R2 corresponding to the second angle transmitting unit contact surface 42, and the reflected view imaged image M as image components. (Hereinafter, in this embodiment, the direct view imaged image R is used when the direct view imaged image R1 corresponding to the first angle transmitting unit contact surface 41 and the direct view imaged image R2 corresponding to the second angle transmitting unit contact surface 42 are not distinguished from each other.)

The direct view imaging markers RM are imaged in the direct view imaged image R as in the first embodiment. In addition, the reflected view imaging markers MM are imaged in the reflected view imaged image M.

The imaging unit 30 detects a gripping state by observing the direct view imaging markers RM and the reflected view imaging markers MM.

Fourth Embodiment

Figure 14:
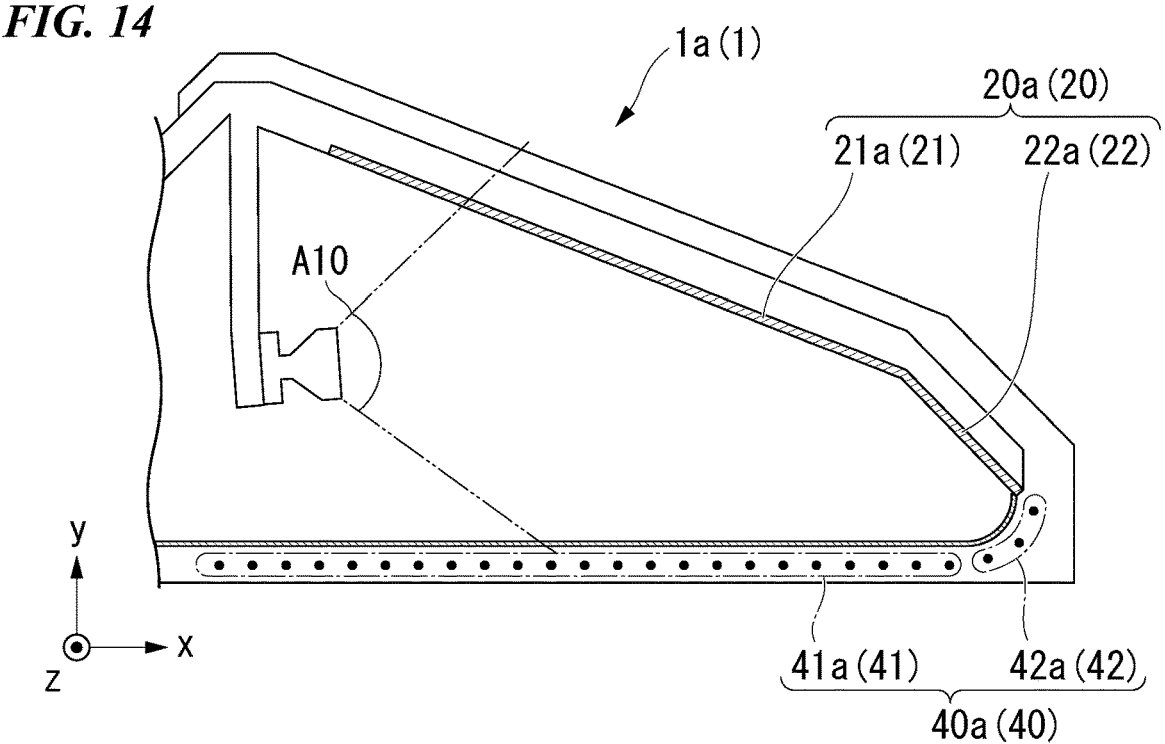
FIG. 14 shows an example of a cross-sectional view of a tactile sensor according to a fourth embodiment.

FIG. 14 shows an example of a cross-sectional view of a tactile sensor according to a fourth embodiment.

The above second embodiment describes an embodiment in which the reflecting unit 20 has the plurality of different angles. In addition, the above third embodiment describes an embodiment in which the transmitting unit contact surface 40 has the plurality of different angles. The fourth embodiment is different from the above embodiments in that the reflecting unit 20 has a plurality of different angles and the transmitting unit contact surface 40 has a plurality of different angles.

In the fourth embodiment, the tactile sensor 1 includes the reflecting unit 20 having the plurality of different angles. In addition, the tactile sensor 1 includes the transmitting unit contact surface 40 having the plurality of different angles. In this example, the tactile sensor 1 includes the first angle reflecting unit 21, the second angle reflecting unit 22, the first angle transmitting unit contact surface 41, and the second angle transmitting unit contact surface 42. (Hereinafter, in this embodiment, the reflecting unit 20 is used when the first angle reflecting unit 21 and the second angle reflecting unit 22 are not distinguished from each other. In addition, the transmitting unit contact surface 40 is used when the first angle transmitting unit contact surface 41 and the second angle transmitting unit contact surface 42 are not distinguished from each other.)

In the fourth embodiment, since the tactile sensor 1 includes the plurality of reflecting units 20 having different angles, the imaging unit 30 can observe a wider range even when the view angle A10 is the same as that of the first embodiment. In addition, in this example, since the tactile sensor 1 includes the plurality of transmitting unit contact surfaces 40 having different angles, the imaging unit 30 can observe a wider range even when the view angle A10 is the same as that of the first embodiment. In particular, in the fourth embodiment, the provision of the second angle transmitting unit contact surface 42 enables an observation even in an x-axis direction. Therefore, when the robot system control unit 90 moves the position of the tactile sensor module 10 in the x-axis direction, a collision with an object in a traveling direction can be detected in advance by an image imaged by the imaging unit 30 included in the tactile sensor 1.

Figure 15:
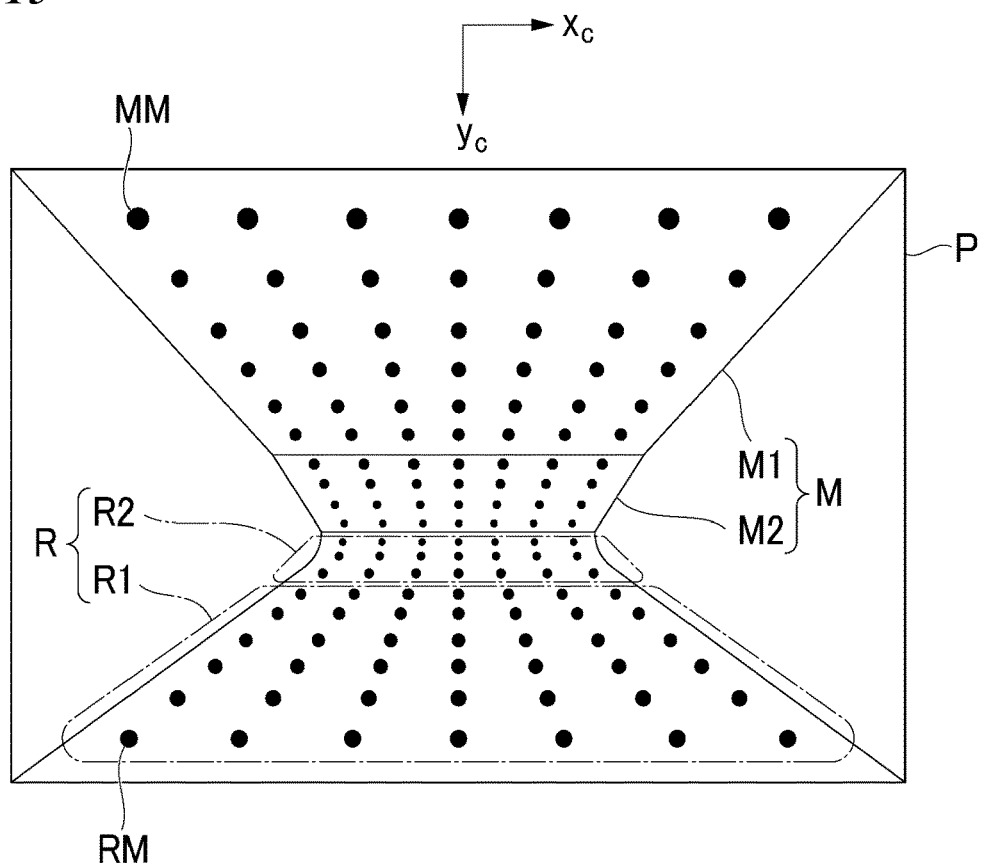
FIG. 15 shows an example of an imageable range of an imaging unit according to the fourth embodiment.

FIG. 15 shows an example of an imageable range of the imaging unit 30 according to the fourth embodiment. In the fourth embodiment, the imaged image P includes the direct view imaged image R1 corresponding to the first angle transmitting unit contact surface 41, the direct view imaged image R2 corresponding to the second angle transmitting unit contact surface 42, the reflected view imaged image M1 corresponding to the first angle reflecting unit 21, and the reflected view imaged image M2 corresponding to the second angle reflecting unit 22 as image components. (Hereinafter, in this embodiment, the direct view imaged image R is used when the direct view imaged image R1 corresponding to the first angle transmitting unit contact surface 41 and the direct view imaged image R2 corresponding to the second angle transmitting unit contact surface 42 are not distinguished from each other. In addition, the reflected view imaged image M is used when the reflected view imaged image M1 corresponding to the first angle reflecting unit 21 and the reflected view imaged image M2 corresponding to the second angle reflecting unit 22 are not distinguished from each other.)

The direct view imaging markers RM are imaged in the direct view imaged image R as in the first embodiment. In addition, the reflected view imaging markers MM are imaged in the reflected view imaged image M.

The imaging unit 30 detects a gripping state by observing the direct view imaging markers RM and the reflected view imaging markers MM.

Fifth Embodiment

Figure 16:
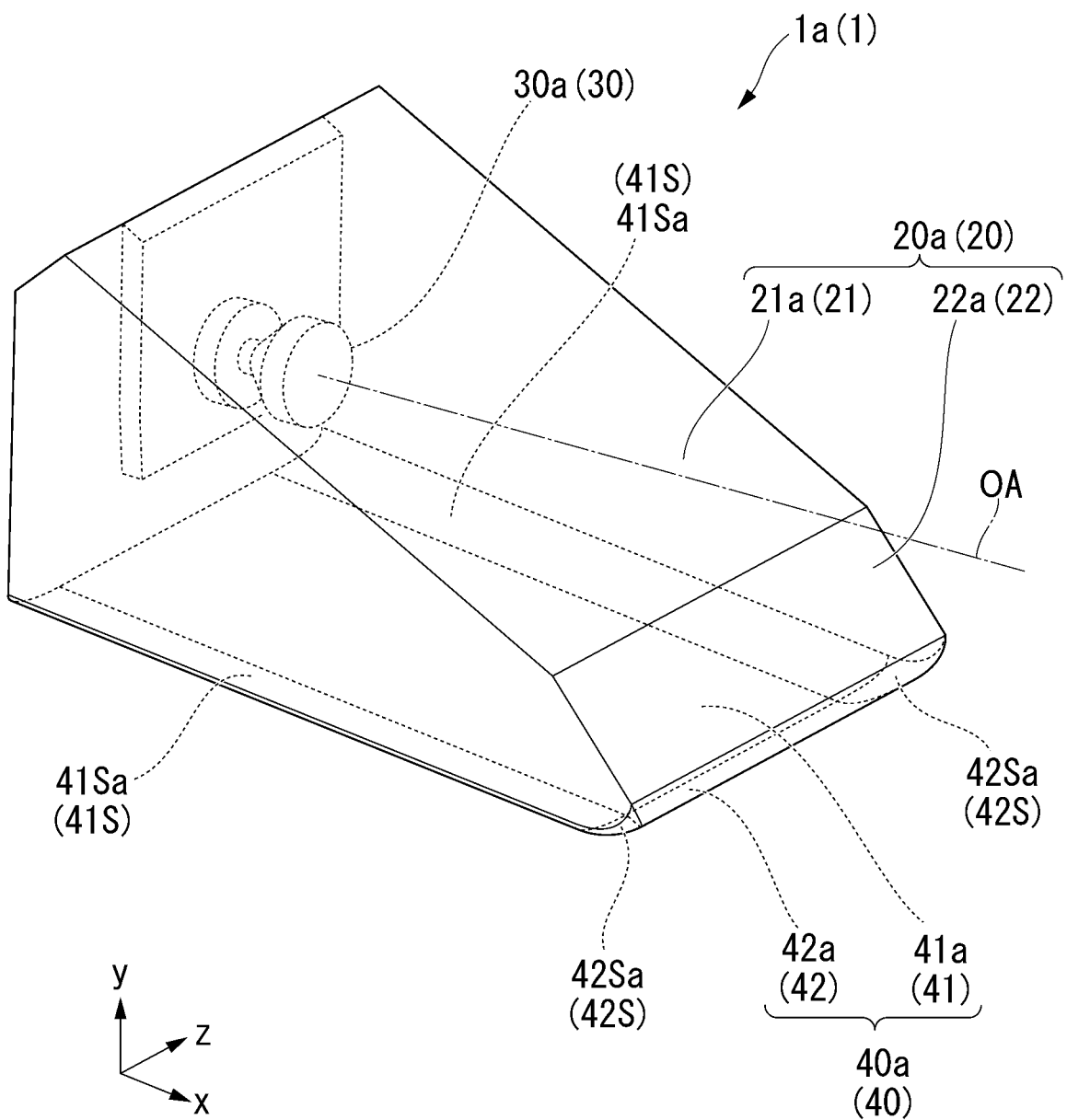
FIG. 16 shows an example of a cross-sectional view of a tactile sensor according to a fifth embodiment.

FIG. 16 shows an example of a cross-sectional view of a tactile sensor according to a fifth embodiment.

In the above embodiments, the transmitting unit contact surface 40 is described as a plane. In addition, the above third and fourth embodiments describe embodiments in which the transmitting unit contact surface 40 includes the plurality of different angles. In particular, the fifth embodiment is different from the third embodiment and the fourth embodiment in that the third embodiment and the fourth embodiment describe that the plurality of angles are only provided in the x-axis direction, whereas in the fifth embodiment, the plurality of angles are also provided in the z-axis direction.

In the fifth embodiment, the tactile sensor 1 includes the transmitting unit contact surface 40 having the plurality of different angles. Here, in the third embodiment and the fourth embodiment, the transmitting unit contact surface 40 is described as having the plurality of different angles in the x-axis direction. In the fifth embodiment, the transmitting unit contact surface 40 further has a plurality of different angles in the z-axis direction.

The tactile sensor 1 includes the plurality of reflecting units 20. In this example, the tactile sensor 1 includes the first angle reflecting unit 21 and the second angle reflecting unit 22. (Hereinafter, in this embodiment, the reflecting unit 20 is used when the first angle reflecting unit 21 and the second angle reflecting unit 22 are not distinguished from each other.)

The tactile sensor 1 includes the transmitting unit contact surface 40 having the plurality of different angles. In this example, the tactile sensor 1 includes the first angle transmitting unit contact surface 41 and the second angle transmitting unit contact surface 42.

Further, the first angle transmitting unit contact surface 41 has a first angle transmitting unit contact surface 41S having different angles in the z-axis direction. The second angle transmitting unit contact surface 42 has a second angle transmitting unit contact surface 42S having different angles in the z-axis direction. (Hereinafter, in this embodiment, the transmitting unit contact surface 40 is used when the first angle transmitting unit contact surface 41, the second angle transmitting unit contact surface 42, the first angle transmitting unit contact surface 41S, and the second angle transmitting unit contact surface 42S are not distinguished from each other.)

In the fifth embodiment, since the tactile sensor 1 includes transmitting unit contact surfaces 40S having a plurality of different angles in the z-axis direction, a wider observation even in the z-axis direction is possible. When the robot system control unit 90 moves the position of the tactile sensor module 10 in the z-axis direction, a collision with an object in a traveling direction can be detected in advance by an image imaged by the imaging unit 30 included in the tactile sensor 1.

That is, in the fifth embodiment, the tactile sensor 1 can avoid the collision.

Figure 17:
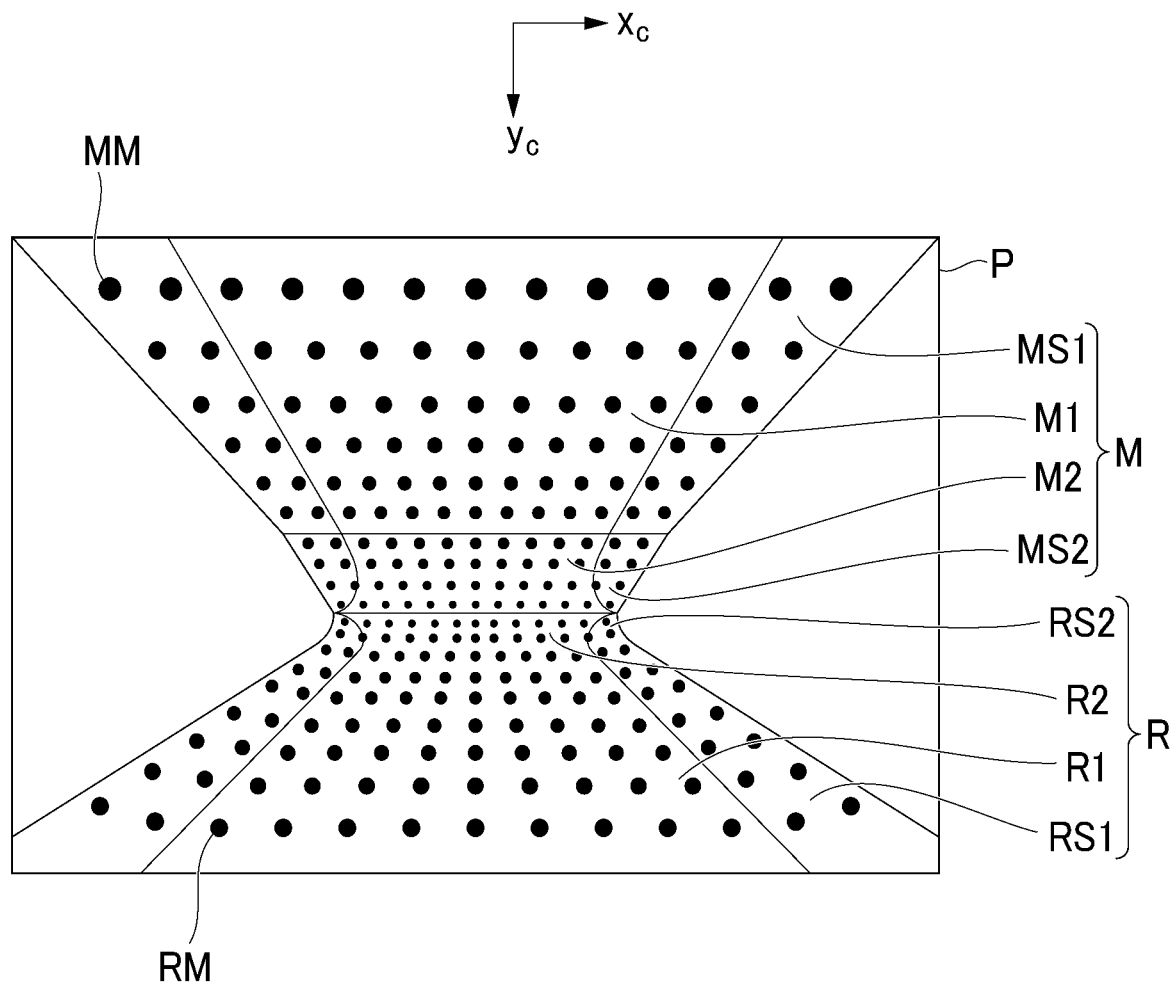
FIG. 17 shows an example of an imageable range of an imaging unit according to the fifth embodiment.

FIG. 17 shows an example of an imageable range of the imaging unit 30 according to the fifth embodiment. In the fifth embodiment, the imaged image P includes the direct view imaged image R1 corresponding to the first angle transmitting unit contact surface 41, a direct view imaged image RS1 corresponding to the first angle transmitting unit contact surface 41S, the direct view imaged image R2 corresponding to the second angle transmitting unit contact surface 42, a direct view imaged image RS2 corresponding to the second angle transmitting unit contact surface 42S, the reflected view imaged image M1 corresponding to the first angle reflecting unit 21, and the reflected view imaged image M2 corresponding to the second angle reflecting unit 22, as image components. (Hereinafter, in this embodiment, the direct view imaged image R is used when the direct view imaged image R1, the direct view imaged image R2, the direct view imaged image RS1, and the direct view imaged image RS2 are not distinguished from each other. In addition, the reflected view imaged image M is used when the reflected view imaged image M1 corresponding to the first angle reflecting unit 21 and the reflected view imaged image M2 corresponding to the second angle reflecting unit 22 are not distinguished from each other.)

The reflected view imaged image M1 includes an MS1 that reflects the transmitting unit contact surfaces 40S.

The reflected view imaged image M2 includes an MS2 that reflects the transmitting unit contact surfaces 40S.

The direct view imaging markers RM are imaged in the direct view imaged image R as in the first embodiment. In addition, the reflected view imaging markers MM are imaged in the reflected view imaged image M.

The imaging unit 30 detects a gripping state by observing the direct view imaging markers RM and the reflected view imaging markers MM.

In addition, the above tactile sensor module 10 and the gripping state detecting unit 80 are collectively referred to as a tactile sensor system.

[Summary of Effects of Embodiments]

As described above, the tactile sensor 1 according to the present embodiments can detect the gripping state by observing the transparent transmitting unit 43 that deforms along the shape of the gripping target object that is in contact with the contact surface. The tactile sensor 1 includes the reflecting unit 20, and can observe outside the range of the view angle A10 of the imaging unit 30 by observing the direct view imaged image R and the reflected view imaged image M.

Here, in an example of a tactile sensor according to the related art, an imaging unit is arranged perpendicular to a transmitting unit, and no reflecting unit is provided. Therefore, in order to miniaturize the tactile sensor, it is necessary to use the imaging unit having a wide view angle to shorten a distance between the imaging unit and the transmitting unit, or to miniaturize the imaging unit itself. When the view angle of the imaging unit is made wider or the imaging unit is miniaturized, there is a problem that an imaging quality is lowered and a detection accuracy of the gripping state of the object is lowered. That is, methods according to the related art have a problem that miniaturization is not easy.

According to the tactile sensor 1 of the present embodiments, in addition to directly observing the transmitting unit 43, the transmitting unit 43 can be observed by the reflecting unit 20. Therefore, it is unnecessary to arrange the imaging unit at the position where the transmitting unit 43 is imaged by a direct view (the position where the imaging optical axis of the imaging unit is parallel to a normal line direction of the transmitting unit). In addition, since the tactile sensor 1 according to the present embodiments uses a method for observing the transmitting unit 43 by the reflecting unit 20 in addition to directly observing the transmitting unit 43, a wider range can be imaged, and thus the tactile sensor 1 can be configured without widening the imaging unit 30 or miniaturizing the imaging unit 30.

That is, the tactile sensor 1 according to the present embodiments may facilitate the miniaturization.

In addition, another example of the tactile sensor according to the related art is a configuration in which the transmitting unit 43 is not provided and the imaging unit cannot image a gripped gripping target object. In the other example of the tactile sensor according to the related art, there is a problem that detection by the imaging unit is not possible even when a slip occurs in the gripping state of the gripping target object.

Since the tactile sensor 1 of the present embodiments includes the transmitting unit 43, the imaging unit 30 can detect the slip occurred in the gripping state of the gripping target object by directly viewing the gripping target object.

That is, according to the tactile sensor 1 of the present embodiments, the imaging unit 30 can image a wider range by observing the transmitting unit 43 by the reflecting unit 20 in addition to directly observing the transmitting unit 43, and the imaging unit 30 can detect the slip occurred in the gripping state of the gripping target object by directly viewing the gripping target object.

In addition, according to the above embodiments, the imaging unit 30 is arranged such that the imaging optical axis OA of the imaging unit 30 and the normal line of the transmitting unit non-contact surface 47 of the transmitting unit 43 have an intersection.

In the related art, the imaging unit 30 is arranged at a position where the imaging optical axis OA of the imaging unit 30 is parallel to the normal line of the transmitting unit non-contact surface 47 of the transmitting unit 43. Therefore, a size of the tactile sensor 1 depends on the size of the imaging unit 30.

However, according to the above embodiments, the imaging unit 30 can be installed such that the imaging optical axis OA of the imaging unit 30 and the normal line of the transmitting unit non-contact surface 47 of the transmitting unit 43 have an intersection.

That is, the tactile sensor 1 according to the present embodiment may facilitate the miniaturization.

In addition, according to the above embodiments, the reflecting unit 20 includes the plurality of reflecting surfaces having different normal line angles. Therefore, the imaging unit 30 provides a field of view in which a range that can be intentionally observed is narrowed. The tactile sensor 1 can limit the range in which the gripping target object is present in a three-dimensional space by observing the gripping target object with the plurality of reflecting surfaces.

Therefore, the tactile sensor 1 can specify presence of the gripping target object in a more limited three-dimensional space, and can detect the gripping state more accurately. In addition, when the robot system 100 drives the tactile sensor 1 to approach the gripping target object, the tactile sensor 1 can find the gripping target object more quickly by accurately grasping the three-dimensional space.

In addition, according to the above embodiments, the transmitting unit 43 includes a plurality of regions having different normal line angles with respect to the imaging optical axis OA of the imaging unit 30, and the imaging unit 30 can image an image of the object present on the transmitting unit contact surface 40 side incident through each of the plurality of regions of the transmitting unit 43. The tactile sensor 1 can grasp the gripping target object more accurately by observing the gripping target object by the direct view and the reflected view.

That is, according to the above embodiments, the tactile sensor 1 can detect the gripping state more accurately.

In addition, according to the above embodiments, the transmitting unit 43 includes the plurality of regions having different normal line angles with respect to the imaging optical axis OA of the imaging unit 30. The imaging unit 30 can image an image of the object present on the transmitting unit contact surface 40 side incident through each of the plurality of regions of the transmitting unit 43. Therefore, the imaging unit 30 can image a wider range by the direct view as compared with a case where the transmitting unit 43 is a plane.

That is, the tactile sensor 1 can detect the image of the object when the robot system control unit 90 moves the position of the tactile sensor module 10. Therefore, the tactile sensor 1 in the above embodiments can avoid the collision.

In addition, according to the above embodiments, the gripping state detecting unit 80 acquires the image imaged by the imaging unit 30, and detects the contact state of the object with respect to the contact surface based on the acquired image.

That is, the robot system 100 can detect the gripping state of the object by including the gripping state detecting unit 80.

The gripping state detecting unit 80 provides information to the robot control unit 91, so that the robot control unit 91 can control the robot system 100.

Although the embodiments for carrying out the invention have been described above using the embodiments, the invention is not limited to these embodiments, and various modifications and substitutions can be made without departing from the gist of the invention.

REFERENCE SIGN LIST 1 tactile sensor
10 tactile sensor module
11 sensor connecting portion
100 robot system
110 tip portion
120 upper arm portion
130 joint portion
140 lower arm portion
150 main horizontal shaft portion
160 main vertical shaft portion
170 base portion
90 robot system control unit
20 reflecting unit
30 imaging unit
40 transmitting unit contact surface
47 transmitting unit non-contact surface
43 transmitting unit
45 marker
50 frame
70 rigid layer
91 robot control unit
92 input unit
93 output unit
80 gripping state detecting unit
81 image acquiring unit
82 image processing unit
83 control unit
84 reference state storage unit
A10 view angle
OA imaging optical axis
IA10 first incident angle
RA10 first reflecting angle
IA20 second incident angle
RA20 second reflecting angle
IA30 third incident angle
RA30 third reflecting angle
AR1 first imaging range
AR2 second imaging range
AR3 third imaging range
OB1 first object
OB2 second object
OB3 third object
RM direct view imaging marker
MM reflected view imaging marker
R direct view imaged image
M reflected view imaged image
P imaged image

The invention claimed is:
1. A tactile sensor comprising:
a transmitting unit including a first surface that is capable of coming into contact with a gripping target object and a second surface that is a back surface of the first surface, the transmitting unit made of a material that transmits light;

an imaging unit that is capable of imaging an image of the gripping target object present on a side of the first surface of the transmitting unit from a side of the second surface; and a reflecting unit arranged on the side of the second surface of the transmitting unit and configured to reflect light entering from the side of the first surface through at least a part of a region of the transmitting unit and guide the light into an imaging view angle of the imaging unit.

2. The tactile sensor according to claim 1, wherein:

at least a part of the transmitting unit deforms along a shape of the gripping target object that is in contact with the first surface, and the imaging unit is further capable of imaging images of markers attached to the transmitting unit from the side of the second surface, the markers indicating a deformation of the transmitting unit.

3. The tactile sensor according to claim 1, wherein:

the imaging unit is arranged such that an imaging optical axis of the imaging unit and a normal line of the second surface of the transmitting unit have an intersection.

4. The tactile sensor according to claim 1, wherein:

the reflecting unit includes a plurality of reflecting surfaces having different normal line angles with respect to an imaging optical axis of the imaging unit.

5. The tactile sensor according to claim 1, wherein:

the imaging unit images a first image and a second image, the first image being an image of an imaging target region of the transmitting unit formed by light incident without passing through the reflecting unit, and a second image being an image of the imaging target region of the transmitting unit formed by light reflected by the reflecting unit and then incident on the imaging unit, as images of the transmitting unit.

6. The tactile sensor according to claim 1, wherein:

the transmitting unit includes a plurality of regions having different normal line angles with respect to an imaging optical axis of the imaging unit, and the imaging unit is capable of imaging an image of the gripping target object present on the side of the first surface formed by light incident through each of the plurality of regions of the transmitting unit.

7. A tactile sensor system comprising:

a tactile sensor comprising:

a transmitting unit including a first surface that is capable of coming into contact with a gripping target object and a second surface that is a back surface of the first surface, the transmitting unit made of a material that transmits light, an imaging unit that is capable of imaging an image of the gripping target object present on a side of the first surface of the transmitting unit from a side of the second surface, and a reflecting unit arranged on the side of the second surface of the transmitting unit and configured to reflect light entering from the side of the first surface through at least a part of a region of the transmitting unit and guide the light into an imaging view angle of the imaging unit; and a detecting unit configured to acquire the image imaged by the imaging unit and detect a contact state of the target gripping object with respect to the first surface based on the acquired image.

8. A computer-readable non-transitory storage medium storing thereon a program causing a computer to execute operations by a tactile sensor, the tactile sensor comprising:

a transmitting unit including a first surface that is capable of coming into contact with a gripping target object and a second surface that is a back surface of the first surface, the transmitting unit made of a material that transmits light, an imaging unit that is capable of imaging an image of the gripping target object present on a side of the first surface from a side of the second surface, and a reflecting unit arranged on the side of the second surface and configured to reflect light entering from the side of the first surface through at least a part of a region of the transmitting unit and guide the light into an imaging view angle of the imaging unit, and the operations comprising:

acquiring an image imaged by the imaging unit; and detecting a contact state of the gripping target object with respect to the first surface based on the image acquired in the image acquisition step.

* * * * *